United States Patent [19]

Lapatovich et al.

[11] Patent Number: 4,480,213
[45] Date of Patent: Oct. 30, 1984

[54] COMPACT MERCURY-FREE FLUORESCENT LAMP

[75] Inventors: Walter P. Lapatovich, Watertown; George R. Gibbs, Marlboro; Joseph M. Proud, Wellesley Hills, all of Mass.

[73] Assignee: GTE Laboratories Incorporated, Waltham, Mass.

[21] Appl. No.: 401,528

[22] Filed: Jul. 26, 1982

[51] Int. Cl.³ ............... H05B 41/16; H05B 41/24
[52] U.S. Cl. ............... 315/248; 315/267; 313/637; 313/638
[58] Field of Search ............ 315/248, 267; 313/485, 313/572, 607, 637, 638, 639 640, 643

[56] References Cited

U.S. PATENT DOCUMENTS

| | | | |
|---|---|---|---|
| 2,135,718 | 11/1938 | Krefft et al. | 313/415 X |
| 3,484,640 | 12/1969 | Johnson | 313/638 X |
| 3,586,898 | 6/1971 | Speros et al. | 313/636 X |
| 4,296,350 | 10/1981 | Maya | 313/573 |

OTHER PUBLICATIONS

Muck et al., *Quantatative Radiation Measurement of a Pure Aluminum Chloride Plasma*, 11th IcPIG Prague, 1973.
Speros et al., *Thermodynamic and Kinetic Considerations Pertaining to Molecular Arcs*, High Temperature Science vol. 4, No. 2, Apr. 1972.

Primary Examiner—Saxfield Chatmon
Attorney, Agent, or Firm—J. Stephen Yeo

[57] ABSTRACT

A compact fluorescent lamp has an outer envelope in which there is supported a capsule containing a mercury-free fill comprised of aluminum trichloride. The fill is energized to produce a plasma discharge which emits ultraviolet and visible radiation. Phosphor, in the form of a particulate layer or a gas, converts the ultraviolet into visible light. The lamp may contain electrodes or be electrodeless. In the electrodeless embodiment RF energy may be capacitively or inductively coupled to the fill.

9 Claims, 4 Drawing Figures

COMPACT MERCURY-FREE FLUORESCENT LAMP

CROSS REFERENCE TO RELATED APPLICATION

U.S. Patent Application Ser. No. 402,175 filed July 26, 1982 for Mercury-Free Discharge Lamp divulges an ultraviolet lamp which contains a filling of aluminum trichloride and one or more inert gases.

BACKGROUND OF THE INVENTION

This invention pertains to electromagnetic discharge lamps and, more particularly, is concerned with fluorescent lamps.

Perhaps the most familiar electromagnetic discharge light source is the common fluorescent lamp. Usually the lamp has a cylindrical envelope filled with a low pressure inert gas and a small dose of metallic mercury. Voltage, when applied to electrodes within the envelope, accelerates electrons which ionize the inert gas, initiating a discharge. Heat and electrons from the discharge vaporize and excites the mercury which emits ultraviolet and visible radiation, with a strong ultraviolet line at 253.7 nm. A phosphor layer inside the envelope converts the ultraviolet to visible light.

Many modifications have been proposed to improve the conventional fluorescent lamp which is less compact then an incandescent lamp of equal luminescence. Departing from a straight tube configuration, envelopes have been formed into toroids, spheriods, re-entrant cavities, and many other configurations. Beam shaping electrodes have been demonstrated, as have electrodeless discharges. Most of these modifications, however, call for mercury in the discharge medium.

Effort has also been made to improve the filling. For examples, U.S. Pat. No. 4,427,921 issued Jan. 24, 1984 to Proud et al for "Electrodeless Ultraviolet Light Source" disclosed fillings including I, $HgI_2$, and $CdI_2$, and U.S. Pat. No. 4,427,922 issued Jan. 24, 1984 to Proud et al for "Electrodeless Light Source" describes fillings including HgI, HgBr, and HgCl.

In the related art of high pressure mercury vapor lamps it has been known for a number of years to improve the visible output of such lamps by adding metal halides to a filling of mercury and inert gas. U.S. Pat. No. 3,586,898 "Aluminum Chloride Discharge Lamp" issued to Speroes and Simper divulges a filling of aluminum trichloride, mercury, and inert gas with the optional addition of aluminum tri-iodine. The lamp's envelope is alumina or alumina coated quartz to avoid reaction between $AlCl_3$ and $SiO_2$. Krefft et al divulges in U.S. Pat. No. 2,135,718 a high pressure mercury lamp with an inner tubular container and an outer envelope.

Mercury and cadmium are known to accumulate in biological systems and are hazards to human health. While the dosage of these metals expected from individual lamps is likely to be below the threshold of harm, it would be desirable to avoid their use if an alternate efficient fill material was available.

Copending U.S. Patent application Ser. No. 402,175, filed July 26, 1982 for Mercury-Free Discharge Lamp divulges an ultraviolet lamp which contains a filling of aluminum trichloride and one or more inert gas.

Accordingly, it is an object of this invention to provide an efficient fluorescent lamp specifically arranged to use a filling of aluminum trichloride and one or more inert gas. Another object is to provide a fluorescent lamp more compact than conventional fluorescent lamps.

SUMMARY OF THE INVENTION

Briefly, there is provided a fluorescent lamp having an envelope. Within the envelope there is provided a capsule containing a mercury-free fill which includes aluminum trichloride. When the fill is sufficiently energized to sustain a plasma discharge, it emits visible and ultraviolet light. A phosphor converts the ultraviolet to visible light. One way to energize the fill is with RF energy which may be capacitively or inductively coupled. In one embodiment, capacitive coupling structures are used to couple RF energy to the fill. The structures may be tapered or may be solid or a mesh or perforated foil.

In another embodiment an inductive coil is wound about the capsule for coupling RF energy to the fill. Another way to energize the lamp is with an electric field between internal electrodes in contact with the fill. The electrodes are externally coupled to conventional voltage sources.

In one aspect of the invention, the phosphor is deposited as a layer on the inner surface of the envelope. In keeping with another aspect of the invention, a phosphor gas is used.

DESCRIPTION OF THE INVENTION

Figure 1:
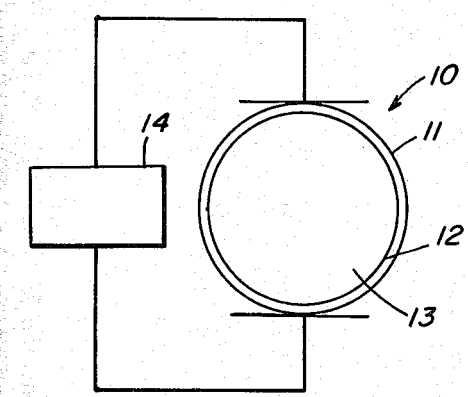
FIG. 1 schematically represents a generalized ultraviolet lamp.

FIG. 1 shows a generalized high intensity, ultraviolet source 10 characterized by a molecular discharge to produce intense ultraviolet radiation. The specific molecules are dissociated from aluminum trichloride ($AlCl_3$). Mercury or cadmium is not used.

A vessel 11 defines a discharge chamber 12, which contains a filling 13 of aluminum trichloride vapor and one or more inert gases, preferably neon (Ne). Electrical energy from electrical source 14 is coupled into the discharge chamber. It has been found that when the pressures of the aluminum trichloride vapor and neon are within a broad range, the mixture can sustain an electrical discharge at moderate power densities (40–80 $W/cm^3$). The pressure of the vapor can be in the range of 2 torr of $AlCl_3$ vapor and 2 torr of Ne.

During discharge the components of the mixture become excited into a plasma state characterized by a high electron temperature.

Radiation from excited states of the molecules $AlCl_3$, $AlCl_2$, and AlCl, and atomic Al, is observed as ultraviolet and visible light. Plasma reactions which can account for these species include the dissociative attachment reactions;

(1)

$$AlCl + e^- \longrightarrow Al^* + Cl^-$$

$$AlCl_2 + e^- \longrightarrow Al^* + Cl_2^-$$

Electron collisions with the neon, will produce excited states (Ne*) which can produce excitation exchange with concomitant dissociation similar to those depicted in (1):

$$AlCl_3 + Ne^* \longrightarrow AlCl_2^* + Ne + Cl \qquad (2)$$

$$AlCl_2 + Ne^* \longrightarrow AlCl^* + Ne + Cl$$

$$AlCl + Ne^* \longrightarrow Al^* + Ne + Cl$$

$$AlCl_2 + Ne^* \longrightarrow Al^* + Ne + Cl_2$$

These reactions are reversible and are constantly occurring under equilibrium conditions.

Emission from the excited species (denoted by asterisks) in reactions (1) and (2), specifically from AlCl, pertains to the present invention. The ultraviolet band attributable to AlCl:
$A^1\pi \rightarrow \chi^1\Sigma^+$ near 261.4 nm is a spectroscopically intense feature. This diatomic molecular band has a spectral bandwidth of approximately 28 times as large as the atomic Hg line at 253.7 nm. The peak intensity of the molecular band is less than that of atomic mercury, but the product of peak height times bandwidth (a measure of the UV energy output) is substantially greater in the molecular case (approximately six (6) times as much UV output as Hg).

The ultraviolet emission can be converted to visible light by phosphors surrounding the discharge chamber. This is, of course, the principle of fluorescent lamps. The diatomic AlCl ultraviolet emission is capable of exciting several types of phosphors including sodium salicylate. The polyatomic emission contributes to the visible light produced by the phosphors.

We have found that the use of a mercury-free filling containing aluminum trichloride allows the physical dimensions of a lamp to be substantially reduced since the intense UV source obviates a lengthy positive column discharge.

Embodiments of the lamp according to the invention may feature either electrodeless discharge or electrode discharge.

Figure 2:
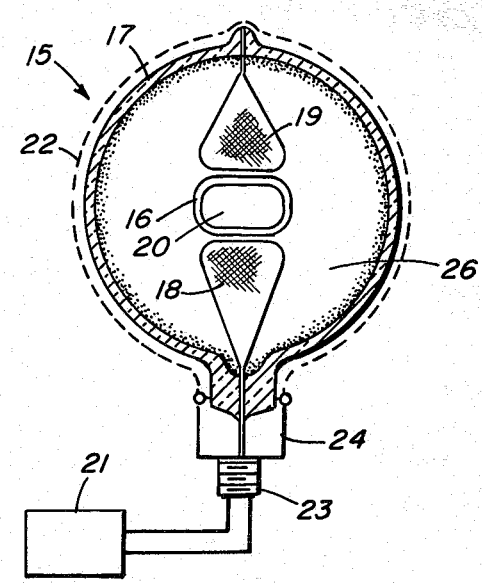
FIG. 2 shows one embodiment of an electrodeless fluorescent lamp according to the invention.

One electrodeless lamp is depicted in FIG. 2. There is seen a lamp 15 having an inner capsule 16 and an outer envelope 17. Capsule 16 is suspended with envelope 17 between a first and second capacitive coupling structures 18, 19. Capsule 16, which may be cylindrical, functions as a discharge chamber and is made of an ultraviolet transparent heat resistant material such as quartz or alumina. Capsule 16 contains a fill 20 including aluminum trichloride and may also contain an inert gas such as argon, krypton, xenon, neon, or nitrogen. A measured dose of the aluminum trichloride is sealed in the capsule during manufacture. When energy is coupled into the capsule 16, the inert gas atoms heat and vaporize at least some of the aluminum trichloride. The vapor pressure of the aluminum trichloride, after lamp warmup, is preferably about 1 torr. The pressure of the inert gas, if any, is about 2 torr.

Lamp 15 is energized by RF energy capacitively coupled from RF source 21 through structures 18, 19. Structures 18, 19 may be tapered to match the load of the capsule 16 to source 21 and may be solid or formed from wire mesh or perforated foil. The frequency 915 Mhz is allocated but not critical to the operation of the lamp.

Envelope 17 is made of soft glass or pyrex or the like. It is shown arbitrarily as a sphere. Envelope 17 carries a conductive mesh 22 of wire or filling which provides shielding at the operating frequencies while permitting passage of light.

A coaxial connector 23 may be provided at the base 24 of the lamp to interface with RF source 21. The center conductor of connector 23 is connected to the first coupling structure 18. The outer conductor of connector 23 is connected to mesh 22 which is in electrical communication with the second coupling structure 19.

When an electric field from source 21 appears between the first and second coupling structures 18, 19, the fill material 20 with capsule 16 supports a plasma discharge providing ultraviolet and visible radiation as explained previously.

Envelope 17 may be coated with a phosphor 25 which is protected from the plasma generator in the capsule 16. The phosphor converts the ultraviolet radiation to visible light in the manner of fluorescent lamps. Alternatively, the volume between envelope 17 and capsule 16 may contain a phosphor gas. The volume of capsule 16 may be smaller than the discharge chamber required for a mercury lamp having equivalent output. This is possible because of the broad emission spectrum of AlCl compared to that of mercury which results in less self-absorption of the radiation by the fill.

Figure 3:
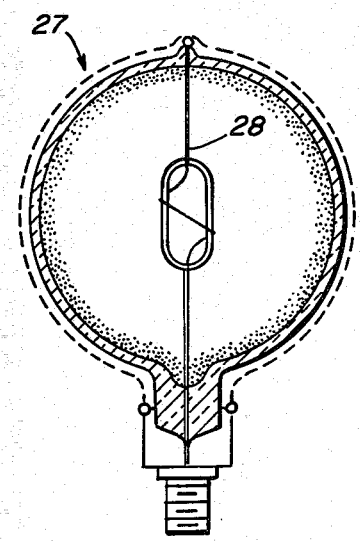
FIG. 3 shows another embodiment of an electrodeless fluorescent lamp according to the invention.

FIG. 3 illustrates another embodiment of an electrodeless lamp 27 wherein the RF energy is inductively coupled to the inner capsule. Instead of capacitive coupling structures, an inductive coil 28 winds about the inner capsule 16. The coil 28 is inductively coupled to the output of the RF source to the capsule. The embodiment is otherwise constructed the same as that of FIG. 2. Like elements are identically referenced.

Figure 4:
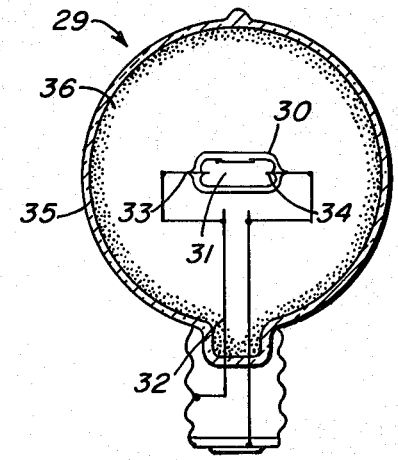
FIG. 4 illustrates an embodiment of an electrode fluorescent lamp according to the invention.

FIG. 4 represents an embodiment of the invention using electrodes. Superfically this lamp is similar to the high pressure lamp of the afore cited U.S. Pat. No. 2,135,718. The present lamp 29 includes an inner capsule 30 containing as low pressure fillin 31 comprised of alumimum trichloride as described above. The inner capsule 30 is supported within an envelope 35 by a current carrying structure 32. The capsule contains tungsten or other refractory metal electrodes 33, 34 so not to react with the plasma. The lamp envelope 35 may carry a phosphor coating 36 or contain a phosphor gas. No exterior ground mesh is required in this embodiment.

The discharge vessel or inner capsule of each embodiment is made of heat resistant transparent material such as fused quartz, or alumina. If less expensive quartz is chosen, the plasma products of aluminum chloride will react with active silicon near the inner surface of the quartz vessel. This reaction, if unchecked, releases highly volatile silicon tetrachloride ($SiCl_4$) and which eventually degrades the performance of the lamp. To prevent this, the inner walls of the discharge vessel may be precoated with a refractory material. During manufacture of the lamp the discharge vessel may be charged with a mixture of aluminum chloride and a buffer gas. A discharge is induced through the mixture intentionally causing a plasma reaction with the walls of the discharge vessel. A coating of $3Al_2O_3.2SO_2$ is formed on the inner surface of the vessel. This method of depositing refractory coatings is disclosed in U.S. Pat. No. 4,436,762 issued Mar. 13, 1984 to W. P. Lapatovich, et al for "Low Pressure Plasma Discharge Formation of Refractory Coating".

The vessel is then evacuated to $10^{-7}$ torr and baked at 1000° C. The vessel is then refilled with fresh aluminum chloride and inert gas and sealed.

The resulting lamp is more compact than conventional mercury filled lamps, being about the same size as an incandescent lamp having the same luminosity.

While there has been shown and described what are considered preferred embodiments of the present invention, it will be obvious to those skilled in the art that various changes and modifications may be made therein without departing from the invention as defined by the appended claims.

We claim:

1. A fluorescent lamp comprised of:
a sealed glass envelope;
a sealed capsule supported within said envelope;
said capsule containing a mercury-free fill including aluminum trichloride;
means for vaporizing said aluminum trichloride to a pressure of approximately 1 torr;
means for energizing said fill into a plasma discharge to produce a diatomic AlCl emission of ultraviolet light in a band near 261.4 nm; and
a phosphor deposed between the inner surface of said glass envelope and said capsule for converting ultraviolet light emitted from said discharge into visible light.

2. The fluorescent lamp of claim 1 which further comprises a light passing, RF blocking mesh about said envelope and said means for energizing said fill includes a first and second capacitive coupling structure arranged in proximity to said capsule and means for coupling said structure to a RF power source.

3. The fluorescent lamp of claim 2 wherein said capacitive coupling structures are tapered to provide a RF match.

4. The fluorescent lamp of claim 3 wherein said coupling structures are solid.

5. The fluorescent lamp of claim 3 wherein said coupling structures are mesh.

6. The fluorescent lamp of claim 1 which further comprises a light passing, RF blocking mesh about said envelope, and said means for energizing said fill includes an inductive coil wound about said capsule and means for coupling said coil to an RF power source.

7. The fluorescent lamp of claim 1 wherein said means for energizing said fill includes at least two electrodes having ends arranged within said capsule and means for coupling said electrodes to a voltage source.

8. The fluorescent lamp of claims 1, 2, 3, 4, 5, 6 or 7 wherein said phosphor is arranged as a layer on the internal surface of the envelope.

9. The fluorescent lamp of claims 1, 2, 3, 4, 5, 6 or 7 wherein said phosphor is a gas filling the volume between said envelope and said capsule.

* * * * *